(12) United States Patent
McCune et al.

(10) Patent No.: US 8,398,517 B2
(45) Date of Patent: Mar. 19, 2013

(54) JOURNAL BEARING WITH SINGLE UNIT JUMPER TUBE AND FILTER

(75) Inventors: Michael E. McCune, Colchester, CT (US); Alessio Pescosolido, West Hartford, CT (US); William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 664 days.

(21) Appl. No.: 12/627,117

(22) Filed: Nov. 30, 2009

(65) Prior Publication Data

US 2010/0317478 A1    Dec. 16, 2010

Related U.S. Application Data

(63) Continuation-in-part of application No. 12/482,053, filed on Jun. 10, 2009, now Pat. No. 8,246,503.

(51) Int. Cl.
*F16H 57/04* (2010.01)
(52) U.S. Cl. .......................................... 475/159; 475/331
(58) Field of Classification Search .................. 475/159, 475/160, 331; 277/382
See application file for complete search history.

(56) References Cited

U.S. PATENT DOCUMENTS

| | | | | |
|---|---|---|---|---|
| 3,623,737 A | * | 11/1971 | Eckert | 277/382 |
| 5,102,379 A | | 4/1992 | Pagluica et al. | |
| 5,391,125 A | * | 2/1995 | Turra et al. | 475/346 |
| 5,433,674 A | | 7/1995 | Sheridan et al. | |
| 6,223,616 B1 | * | 5/2001 | Sheridan | 74/468 |
| 6,964,155 B2 | | 11/2005 | McCune et al. | |
| 7,021,042 B2 | | 4/2006 | Law | |
| 8,172,716 B2 | * | 5/2012 | McCune | 475/331 |
| 2006/0063637 A1 | * | 3/2006 | Law | 475/331 |
| 2007/0225111 A1 | | 9/2007 | Duong et al. | |
| 2008/0116010 A1 | | 5/2008 | Portlock et al. | |
| 2010/0317477 A1 | * | 12/2010 | Sheridan et al. | 475/159 |

* cited by examiner

*Primary Examiner* — Justin Holmes
*Assistant Examiner* — Huan Le
(74) *Attorney, Agent, or Firm* — Kinney & Lange, P.A.

(57) ABSTRACT

A journal bearing includes a central body having first passageway and a filter module. The central body extends axially and is adapted to be supported at each outer end. The first passageway extends generally axially through a portion of the central body. The filter module is disposed in the first passageway and is configured to trap debris from a lubricant fluid flowing therethrough. In one embodiment, the filter module is adapted to be inserted and removed from the first passageway as a single unit, thereby allowing the filter module to be connected and disconnected from fluid communication with a lubricant manifold positioned adjacent the journal bearing.

15 Claims, 2 Drawing Sheets

JOURNAL BEARING WITH SINGLE UNIT JUMPER TUBE AND FILTER

CROSS-REFERENCE TO RELATED APPLICATION

This application is a continuation-in-part of U.S. patent application Ser. No. 12/482,053, entitled EPICYCLIC GEAR SYSTEM WITH IMPROVED LUBRICATION SYSTEM, and filed on Jun. 10, 2009, the disclosure of which is incorporated by reference in its entirety.

BACKGROUND

The present invention relates to gas turbine engines, and more particularly, to an epicyclic gear system for use in gas turbine engines.

Epicyclic gear systems (trains) are complex mechanisms for reducing or increasing the rotational speed between two rotating shafts or rotors. The compactness of epicyclic gear systems makes them appealing for use in aircraft engines.

The forces and torque transferred through epicyclic gear systems place tremendous stresses on gear system components, making them susceptible to breakage and wear. Because of the large forces and torque transferred by epicyclic gear systems, providing debris free lubrication to the epicyclic gear system is critical to reducing part wear. Unfortunately, to deliver lubrication between gear components, many prior art epicyclic gear systems require multiple parts which themselves require lubrication and assembly. Repair and installation of these parts and others within the engine risks introducing debris into the epicyclic gear system.

SUMMARY

According to the present invention, a journal bearing includes a central body having first passageway and a filter module. The central body extends axially and is adapted to be supported at each outer end. The first passageway extends generally axially through a portion of the central body. The filter module is disposed in the first passageway and is configured to trap debris from a lubricant fluid flowing therethrough. In one embodiment, the filter module is adapted to be inserted and removed from the first passageway as a single unit, thereby allowing the filter module to be connected and disconnected from fluid communication with a lubricant manifold positioned adjacent the journal bearing.

DETAILED DESCRIPTION

The present application describes an epicyclic gear system with a minimum number of components and a single diameter internal passageway that allows debris-free lubricating liquid to reach surfaces of journal bearings in the epicyclic gear system. The configuration of journal bearing allows a filter module to be easily installed therein for effective filtration of liquid lubricant.

Figure 1:
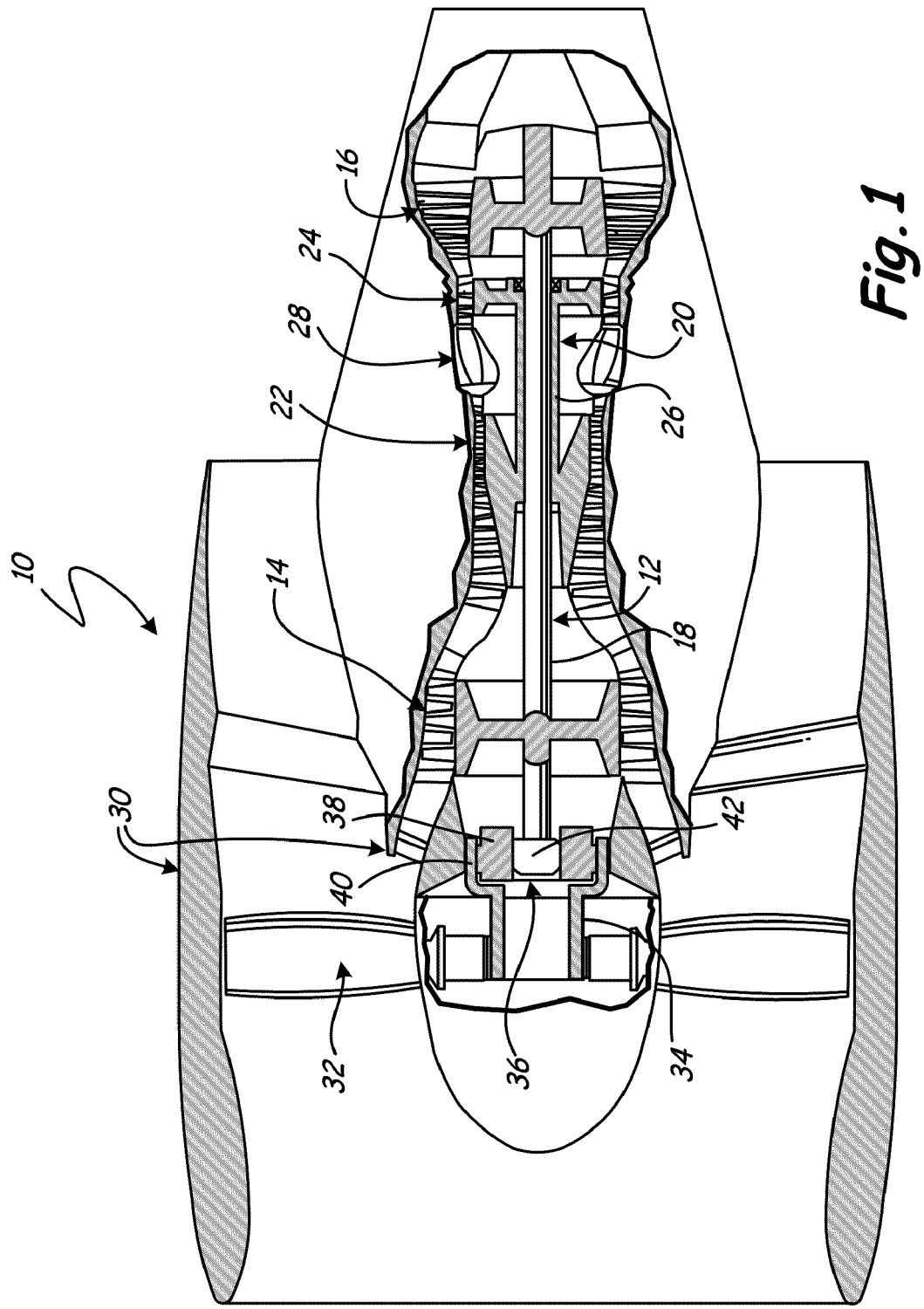
FIG. 1 is a schematic cross-sectional side view of a gas turbine engine with an epicyclic gear system.

FIG. 1 is a schematic cross-sectional side view of gas turbine engine 10. Gas turbine engine 10 includes low pressure unit or spool 12 (which includes low pressure compressor 14 and low pressure turbine 16 connected by low pressure shaft 18), high pressure unit or spool 20 (which includes high pressure compressor 22 and high pressure turbine 24 connected by high pressure shaft 26), combustor 28, nacelle 30, fan 32, fan shaft 34, and epicyclic gear system 36. The epicycle gear system 36 includes star gear 38, ring gear 40, and sun gear 42. The general construction and operation of gas turbine engines is well-known in the art.

As shown in FIG. 1, low pressure unit 12 is coupled to fan shaft 34 via epicyclic gear system 36. Sun gear 42 is attached to and rotates with low pressure shaft 18. Sun gear 42 is mounted on low pressure shaft 18. Ring gear 40 is connected to fan shaft 34 which turns at the same speed as fan 32. Star gear 38 is enmeshed between sun gear 42 and ring gear 40 such that star gear 38 rotates when sun gear 42 rotates. Star gear 38 is rotatably mounted on the stationary gear carrier (not shown) by stationary journal bearing (not shown). When low pressure unit 12 rotates, epicyclic gear system 36 causes fan shaft 34 to rotate at a slower rotational velocity than that of low pressure unit 12, and in the opposite direction.

In an alternative embodiment to the embodiment shown in FIG. 1, epicyclic gear system 36 can be configured in a different manner sometimes called a planetary gear system. In this alternative configuration, star or "planet" gear 38 are rotatably mounted on the gear carrier by bearings. Star gear 38 meshes with sun gear 42. Mechanically grounded, internally toothed ring gear 40 circumscribes and meshes with star gear 38. Input and output shafts extend from sun gear 42 and the gear carrier respectively. During operation, the input shaft rotatably drives sun gear 42, rotating star gear 38 about its own axis, and because ring gear 40 is mechanically grounded, causes star gear 38 to orbit sun gear 42 in the manner of a planet. Orbital motion of star gear 38 turns the gear carrier and the output shaft in the same direction as the input shaft, but slower.

Figure 2:
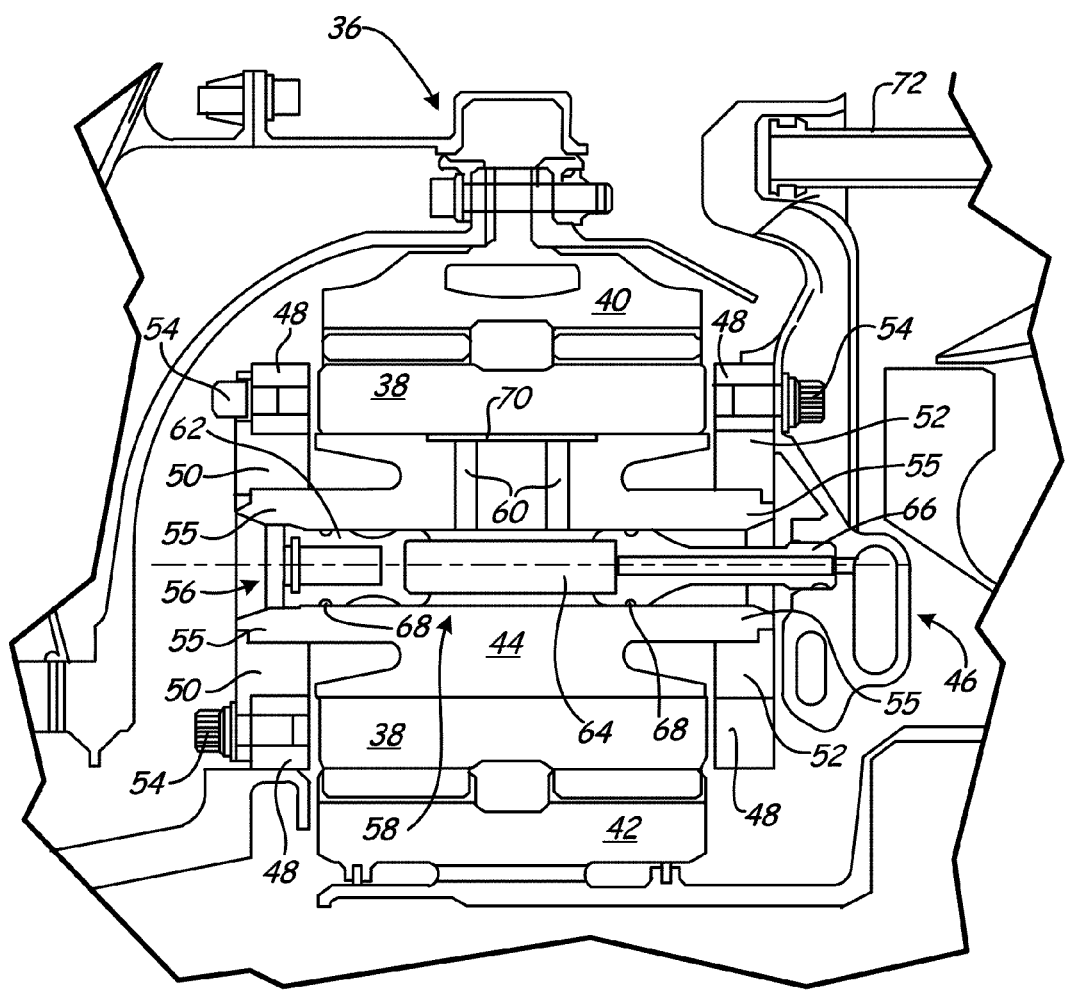
FIG. 2 is a schematic cross-sectional view of the epicyclic gear system of FIG. 1.

FIG. 2 is a cross-sectional view of epicyclic gear system 36 taken through only a single star gear 38. Epicyclic gear system 36, however, includes multiple star gears arranged circumferentially around sun gear 42. In addition to star gear 38, ring gear 40, and sun gear 42, epicyclic gear system 36 includes journal bearing 44, lubricant manifold 46, carrier 48, end caps 50 and 52, and bolts 54. As illustrated in FIG. 2, journal bearing 44 includes central body journal pin 55, axial passage 56, filter module 58, and radial passages 60. Filter module 58 includes plug 62, last chance screen 64, lubrication supply tube 66, and o-rings 68. Radial passages 60 fluidly connect to distribution recess 70. Lubricant manifold 46 is connected to feed tube 72.

As discussed previously, in one embodiment, low pressure unit 12 (FIG. 1) is coupled to fan shaft 34 via epicyclic gear system 36. Sun gear 42 is attached to and rotates with low pressure shaft 18 (FIG. 1). Sun gear 42 is rotatably mounted on low pressure shaft 18. Carrier 48 is stationarily mounted within gas turbine engine 10 (FIG. 1) to the non-rotating engine case walls radially outboard of epicyclic gear system 36. Carrier 48 has two generally interfacing faces which support the ends of the stationary journal bearing 44 via end caps 50 and 52. Ring gear 40 is connected to fan shaft 34 (FIG. 1) which turns at the same speed as fan 32 (FIG. 1). Star gear 38 (only one is illustrated although epicyclic gear system 36 includes a set of multiple star gears) is enmeshed between sun gear 42 and ring gear 40 such that star gear 38 rotates when sun gear 42 rotates. Star gear 38 is rotatably mounted on the stationary carrier 48 by journal bearing 44. When low pressure unit 12 rotates, epicyclic gear system 36 causes fan shaft 34 to rotate at a slower rotational velocity than that of low pressure unit 12. The operation of similar epicyclic gear systems and lubrication systems for epicycle gear systems are further detailed in U.S. Pat. Nos. 6,223,616 and 5,102,379, which are herein incorporated by reference.

In the embodiment shown in FIG. 2, stator journal bearing 44 is positioned inside of rotatable star gear 38. Lubricant manifold 46 is disposed adjacent to journal bearing 44 and is fluidically connected thereto. Star gear 38 is rotatably mounted on carrier 48 by journal bearing 44. End caps 50 and 52 are affixed by welding or other means to the ends of journal pin 55 portion of the journal bearing 44. Bolts 54 secure end caps 50 and 52 to carrier 48.

Journal pin 55 defines axial passage 56 (illustrated as a single diameter thru passage) which receives filter module 58 (specifically, plug 62, last chance screen 64, and lubrication supply tube 66) therein. Rubber o-rings 68 support filter module 58 within axial passage 56. In one embodiment, filter module 58 is adapted to be inserted and removed from axial passage 56 as a single unit, allowing the filter module 58 to be connected and disconnected from fluid communication with the lubricant manifold 46. In particular, plug 62, last chance screen 64, and lubrication supply tube 66 are connected together so as to comprise a single unit that can be inserted or removed from axial passage 56. Specifically, last chance screen 64 is connected between plug 62 and lubrication supply tube 66. In an installed position, plug 62 is disposed within axial passage 56 adjacent an end thereof to stop lubricant from flowing out of axial passage 56. Lubrication supply tube 66 (also known as a jumper tube) has a hollow passage therein and extends from axial passage 56 into lubricant manifold 46. Filter module 58 is fluidly connected to lubricant manifold 46 by jumper tube 62. Lubricant manifold 46 is fed pressurized lubricant from other components of the gas turbine engine via feed tube 72. From lubricant manifold 46, lubricant is supplied through axial passage 56 (via jumper tube 62 and last chance screen 64) to radial passages 60 that extend outward from the axial passage 56.

In one embodiment, last chance screen 64 is constructed of wire mesh with a stainless steel screen and is rated to trap particulates or debris larger than about 40 microns (0.0016 inches) in diameter. In another embodiment, last chance screen 64 comprises a perforated cylinder with a plurality of openings extending therethrough. The openings of the perforated cylinder are sized to trap particulates or debris larger than about 40 microns (0.0016 inches) in diameter. When installed, last chance screen 64 is disposed within axial passage 56 adjacent radial passages 60. Last chance screen 64 is held in this install position by plug 62 and lubrication supply tube 66 which are connected to the journal bearing 44 by o-rings 68.

The close proximity of last chance screen 64 to the surface of journal bearing 44 allows last chance screen 64 to more effectively trap particulates or debris in the lubricant before the lubricant passes to the surface of bearing 44. Because of the location of last chance screen 64 within the journal bearing 44, debris and contamination from repair or installation of components of gas turbine engine 10 (FIG. 1) can be trapped even if introduced downstream of the engine oil filter (not shown). Last chance screen 64 is an important feature to trap debris since journal bearing 44 is not tolerant of contamination due to the extremely thin lubricant film it employs during operational load.

After being filtered, the lubricant flows through radial passages 60 into distribution recess 70 between journal bearing 44 and star gear 38. In one embodiment, distribution recess 70 extends in an arch along the exterior surface of journal bearing 44. The lubricating liquid forms a film of lubrication on journal bearing 44 in the distribution recess 70. From distribution recess 70 the film of lubrication spreads circumferentially and axially due to viscous forces between star gear 38 and journal bearing 44. The lubricant film helps to support star gear 38 and reduce friction between the interior surface of star gear 38 and the exterior surface of journal bearing 44 as star gear 38 rotates. To ensure adequate thickness of the lubricant film, the rate the lubricant is fed to the external surface of the journal bearing 44 varies and is determined by the pressure profile and temperature at the interface between star gears 38 and journal bearings 44. In one embodiment, the flow rate of the lubricant provides the external surface of journal bearing 44 with a minimum lubricant film thickness of between about 0.00508 mm (200 micro inches) and 0.0508 mm (2000 micro inches).

It will be recognized that the present invention provides numerous benefits and advantages. For example, placing filter module 58 within each journal bearing 44 allows filter module 58 to effectively trap debris introduced downstream of the engine oil filter. Constructing filter module 58 as a single unit allows for ease of installation and removal. A single unit filter module 58 also reduces the number of parts and o-rings used to supply lubricant to journal bearing 44, thereby reducing overall manufacturing costs. With the single unit design, the number of o-rings can also be minimized. In one embodiment, o-rings 68 are the only solid connection between journal bearing 44 and the filter module 58 allowing for flexing between the filter module 58 and journal bearing 44 when load is applied to the journal bearing 44. This arrangement reduces the possibility of metal-on-metal wear that can occur if o-rings 68 were not utilized.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A journal bearing comprising:
    a central axially extending body adapted for support at each outer end;
    a first passageway extending generally axially through a portion of the central body;
    a filter module disposed in the first passageway and configured to trap debris from a lubricant fluid flowing therethrough, wherein the filter module includes a last chance screen, a plug, and a lubrication supply tube, wherein the plug and lubrication supply tube position the last chance screen within the first passageway, and wherein the plug and the lubrication supply tube connect to the last chance screen thereby allowing the plug, lubrication supply tube, and last chance screen to be inserted and removed from the first passageway as a single unit.

2. The journal bearing of claim 1, further comprising a second passageway in fluid communication with both the first passageway and an exterior surface of the central body to allow for delivery of lubricant fluid thereto.

3. The journal bearing of claim 1, wherein the filter module is adapted to be inserted and removed from the first passageway as a single unit, thereby allowing the filter module to be connected and disconnected from fluid communication with a lubricant manifold positioned adjacent the journal bearing.

4. The journal bearing of claim 1, wherein the filter module includes a last chance screen constructed of wire mesh and is rated to trap debris larger than about 40 microns (0.0016 inches) in diameter.

5. The journal bearing of claim 1, wherein the filter module includes a last chance screen that is a perforated cylinder with a plurality of openings therein, the openings are sized to trap debris larger than about 40 microns (0.0016 inches) in diameter.

6. The journal bearing of claim 1, wherein at least one o-ring connects the filter module to the central body.

7. The journal bearing of claim 1, wherein the lubrication supply tube extends outward of the journal bearing and defines a passage that communicates lubricant fluid from an oil supply manifold to the last chance screen.

8. An epicyclic gear assembly, comprising:
   an assembly having a ring gear, sun gear, and a plurality of star gears enmeshed between the ring gear and sun gear;
   a carrier disposed adjacent the rotatable sun gear and star gears;
   a journal bearing disposed within each star gear and connected to the carrier, the journal bearing having a passageway therein; and
   a filter module disposed in the passageway and configured to trap debris in a lubricant fluid prior to flow of the lubricant fluid through the passageway to an external surface of the journal bearing, wherein the filter module includes a last chance screen, a plug, and a lubrication supply tube, wherein the plug and lubrication supply tube position the last chance screen within the passageway, and wherein the plug and the lubrication supply tube connect to the last chance screen thereby allowing the plug, lubrication supply tube, and last chance screen to be inserted and removed from the passageway as a single unit.

9. The assembly of claim 8, wherein the filter module includes a last chance screen constructed of wire mesh and is rated to trap debris larger than about 40 microns (0.0016 inches) in diameter.

10. The assembly of claim 8, wherein the filter module includes a last chance screen that is a perforated cylinder with a plurality of openings therein, the openings are sized to trap debris larger than about 40 microns (0.0016 inches) in diameter.

11. The assembly of claim 8, wherein the lubrication supply tube extends outward of the journal bearing and carrier and defines a passage that communicates lubricant fluid from an oil supply manifold to the last chance screen.

12. A gas turbine engine, comprising:
   an epicyclic gear assembly having a ring gear, sun gear, and a plurality of star gears enmeshed between the ring gear and sun gear;
   a carrier mounted within the gas turbine engine and disposed adjacent the rotatable sun gear and star gears;
   a journal bearing disposed within each star gear and connected to the carrier, the journal bearing having a passageway extending therethrough to at least one external surface of the journal bearing; and
   a filter module disposed in the passageway and configured to trap debris in a lubricant fluid prior to flow of the lubricant fluid through the passageway to an external surface of the journal bearing, wherein the filter module includes a last chance screen, a plug, and a lubrication supply tube, wherein the plug and lubrication supply tube position the last chance screen within the passageway, and wherein the plug and the lubrication supply tube connect to the last chance screen thereby allowing the plug, lubrication supply tube, and last chance screen to be inserted and removed from the passageway as a single unit.

13. The gas turbine engine of claim 12, wherein the filter module includes a last chance screen constructed of wire mesh and is rated to trap debris larger than about 40 microns (0.0016 inches) in diameter.

14. The gas turbine engine of claim 12, wherein the filter module includes a last chance screen that is a perforated cylinder with a plurality of openings therein, the openings are sized to trap debris larger than about 40 microns (0.0016 inches) in diameter.

15. The gas turbine engine of claim 12, wherein the lubrication supply tube extends outward of the journal bearing and carrier and defines a passage that communicates lubricant fluid from an oil supply manifold within the gas turbine engine to the last chance screen.

* * * * *